United States Patent [19]
Johnsson

[11] 3,820,810
[45] June 28, 1974

[54] WHEEL SUSPENSION SEALING

[75] Inventor: Lennart Birger Valentin Johnsson, Nodinge, Sweden

[73] Assignee: Aktiebolaget Volvo, Goteborg, Sweden

[22] Filed: Sept. 7, 1972

[21] Appl. No.: 287,039

[30] Foreign Application Priority Data
Sept. 8, 1971 Sweden.............................. 11373/71

[52] U.S. Cl. .............................................. 280/96.2
[51] Int. Cl. .............................................. B60g 7/02
[58] Field of Search .......... 280/96.1, 96.2, 96.3, 93, 280/124 A; 267/20 A

[56] References Cited
UNITED STATES PATENTS

| | | | |
|---|---|---|---|
| 2,173,973 | 9/1939 | Leighton | 280/96.2 B |
| 2,455,343 | 11/1948 | Slack | 280/96.2 B X |
| 3,073,617 | 1/1963 | Schultz | 280/96.2 R |
| 3,166,333 | 1/1965 | Henley | 280/96.2 A |
| 3,261,620 | 7/1966 | Cadiou | 280/96.2 A |

*Primary Examiner*—David Schonberg
*Assistant Examiner*—Terrance L. Siemens
*Attorney, Agent, or Firm*—Newton, Hopkins & Ormsby

[57] ABSTRACT

A sealing for joints in wheel suspensions, in particular for joints in springing suspensions for the front wheels of motor vehicles in which the upper bearing for the steering swivel comprises a trunnion which is substantially vertically carried in the lower spring attachment and which has its lower end attached to the steering swivel. The upper outer link arm end is carried by means of a ball joint at the central portion of the trunnion. The sealing comprises a sealing ring arranged about the trunnion and the lower attachment of the ring comprises the bearing box of the ball joint and the upper attachment of the sealing ring comprises the lower spring attachment. The sealing ring may be shaped as a bellows and be manufactured from rubber.

10 Claims, 2 Drawing Figures

3,820,810

WHEEL SUSPENSION SEALING

BACKGROUND OF THE INVENTION

In a known kind of front wheel constructions of motor cars there is on either side of the upper end of the steering swivel arranged a trunnion having its upper end suspended in the lower attachment of a helical spring forming part of the spring system of the vehicle. The spring movements of the spindle in vertical direction are controlled by link arms, one of which having its upper end attached to a ball joint at the central portion of the trunnion, this portion being sealed by means of bellows seals.

In front wheel constructions of cars of this kind problems often occur with regard to the sealing of said trunnion due to the penetration of dirt, salt and other road splash on its exposed position in the wheel housing.

Hitherto, the bearing for the trunnion has comprised a slide bearing mounted at the lower spring attachment and having an outer sleeve and an inner sleeve and a bushing therebetween and the sealing comprised a lip of rubber vulcanized to the outer sleeve of the slide bearing in such a way that it presses against the end of the inner sleeve projecting out of the bushing. Such an arrangement prevents particles from penetrating into the bearing surfaces. However, such a protection has turned out to be insufficient because a play could be created between the rubber lip and the inner sleeve. At the turning of the inner sleeve in relation to the outer sleeve the rubber lip is further worn in such a way that its sealing qualities are decreased. Further, the bearing may be damaged and soiled at its transport and mounting.

SUMMARY OF THE INVENTION

The object of the present invention is to provide, with simple means, an efficient sealing for wheel suspension of the above kind. The invention is characterised by a sealing ring arranged about the trunnion, the lower attachment of the sealing ring comprising the bearing box of the ball joint and its upper attachment comprising the lower spring attachment.

The drawbacks enumerated in the aforegoing are eliminated by such a sealing. The new sealing makes the previously used and insufficient sealing of the slide bearing superfluous. Thus, the complete slide bearing is no longer necessary and as a consequence thereof the bearing of the trunnion may be considerably simplified.

BRIEF DESCRIPTION OF THE DRAWINGS

The invention will now be elucidated with reference to the accompanying drawings. In the drawings.

DETAILED DESCRIPTION OF A PREFERRED EMBODIMENT

Figure 1:
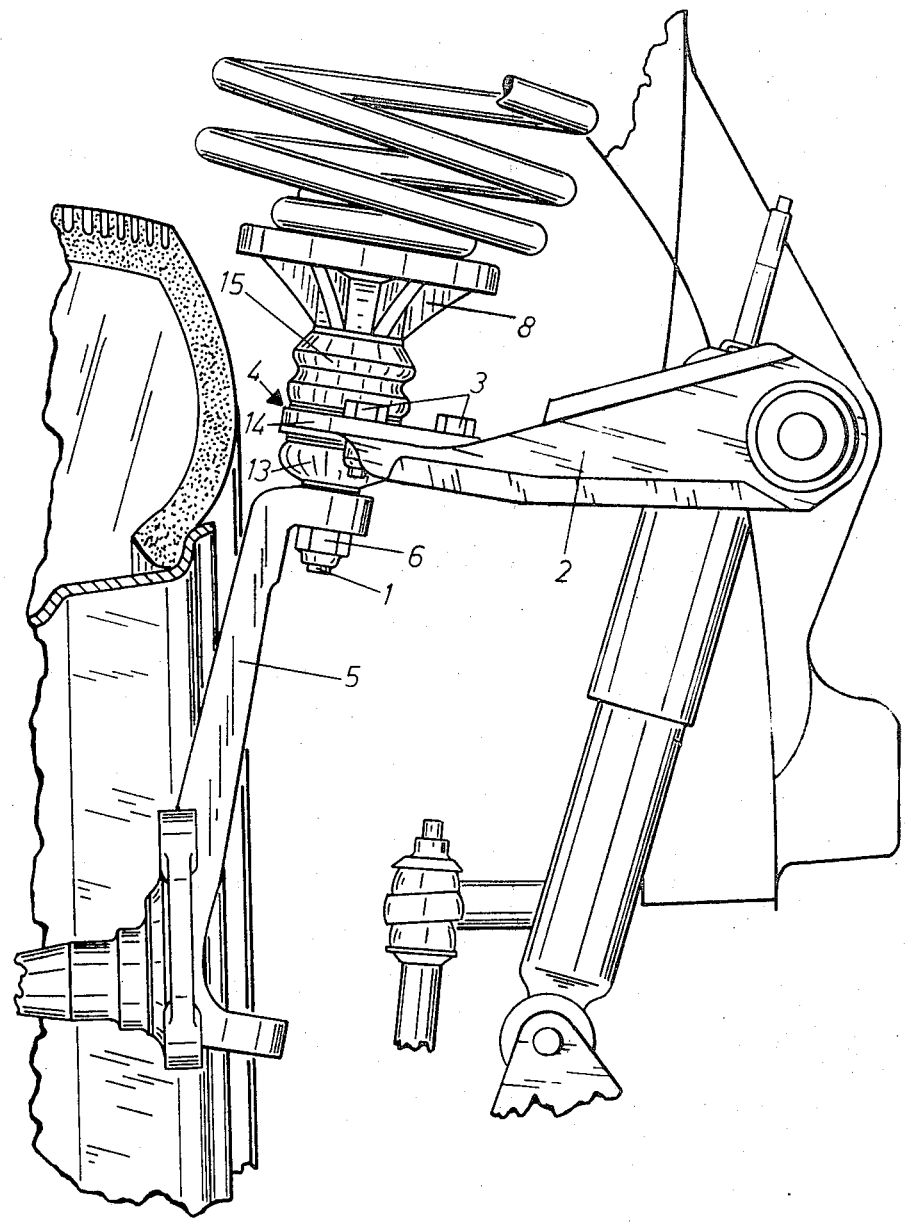
FIG. 1 shows a portion of a front suspension of a car, this portion including the sealing according to the invention.
Figure 2:
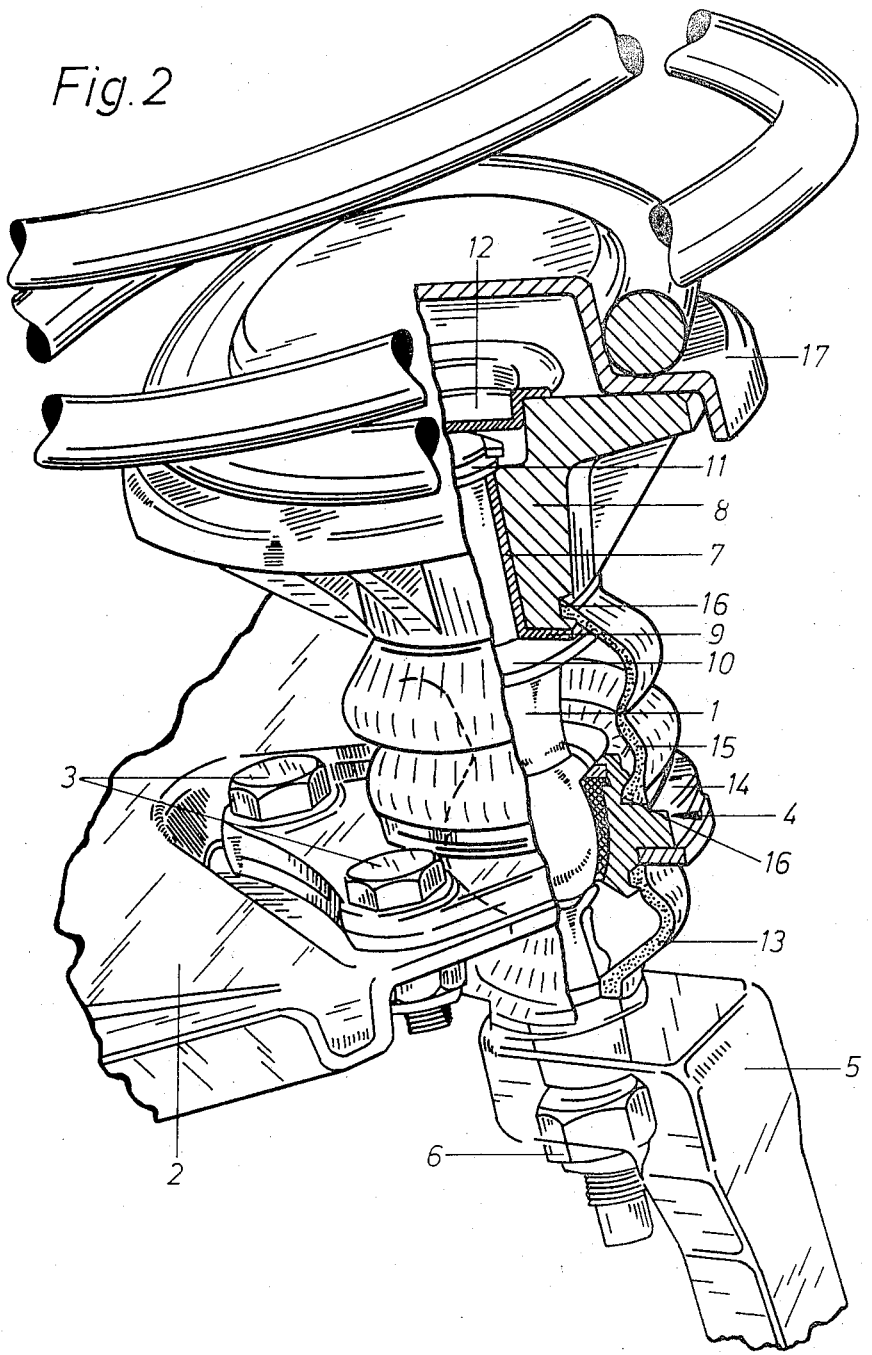
FIG. 2 is a partly broken view on an enlarged scale of the central part shown in FIG. 1.

The embodiment shown in the drawings comprises a trunnion 1 which at its central portion has a ball joint 4 which is attached to the upper link 2 of the wheel suspension by means of bolts 3. Arranged on the lower end — which preferably is conical — of the trunnion is one wheel spindle or steering swivel 5 which is locked to the trunnion by means of a nut 6. The upper end of the trunnion is carried in a bushing 7 which is situated in the interior of the lower spring attachment or suspension seating assembly 8. The bushing 7 is at its lower end provided with a flange 9 which abuts against a corresponding flange 10 on the trunnion 1 for absorbing upwards directed forces. The trunnion is fastened in the bushing 7 by means of a locking ring 11 above the bushing. This end is sealed by means of a cover 12 inserted into the recess in the spring attachment 8 above the bore recieving the bushing 7 for the trunnion 1. A conventional bellows sealing sleeve 13 is arranged as a sealing at the lower side of the ball joint.

According to the invention a sealing ring or sleeve 15 is arranged between the socket or bearing box 14 and the lower spring attachment 8 about the trunnion 1. The sealing ring is preferably bellows-shaped and manufactured from rubber or another resilient material. Its attachments to the bearing box 14 may comprise e.g. notches 16 therein, the edges of the sealing ring adapted to be pressed into said notches and to be retained therein by means of the elasticity of the ring or by means of open spring rings arranged about the border portions. A complete sealing is obtained in this manner for the reason that both ends of the ring are fixed and have no loose abutment against any rotating surface as in previous embodiments. Thus, the sealing ring replaces the previously used upper lip sealing against the ball joint and also the slide bearing sealing and thus in this way one obtains two sealings. It is then very recommendable that the manufacturer of the trunnion with the ball joint mounts the sealing ring on the central portion and the lower spring attachment with the bushing on the trunnion such that the car manufacturer only has to mount a complete unit having its bearing surfaces protected from the beginning.

The invention has been described in the aforegoing for purposes of illustration only and is not intended to be limited by this description or otherwise except as defined in the appended claims. Thus, modifications are possible without departure from the scope of the invention and e.g. the sealing may be cylindrical instead of being bellows-shaped and then comprising a very elastic material. The material used may comprise plastics or the like. The cap 12 is not absolutely necessary as the helical spring mostly abuts against the guiding plate 17 or the like above the spring attachment. Further, the invention is not restricted to wheel suspensions having helical springs but also gas suspensions are possible.

What I claim is:

1. A sealing in joints for wheel suspensions, in particular joints for suspension of front wheels in motor vehicles, wherein the upper bearing of the steering swivels comprises a trunnion which is vertically carried in the lower spring attachment, the lower end of said trunnion being arranged at the steering swivel and the upper outer link arm end being carried by a ball joint at the central portion of said trunnion, wherein the improvement comprises a sealing ring arranged about the trunnion, the lower attachment of said sealing ring comprising the bearing box of the ball joint and the upper attachment of the same comprising the lower spring attachment.

2. A sealing as in claim 1, wherein the improvement comprises a sealing ring of bellows shape.

3. A sealing as in claim 1, wherein the improvement comprises a sealing ring of bellows shape manufactured from rubber.

4. In a vehicle wheel suspension assembly including a wheel spindle and an upper suspension link, a ball joint member secured to said spindle and including a ball portion and an upstanding trunnion surmounting said ball portion, a socket assembly secured to said upper suspension link and swivelly receiving said ball portion, a suspension seating assembly including a body portion having a bore receiving said trunnion and a cover forming a protective enclosure for the upper end of said bore, bearing means in said bore to journal said trunnion, and a flexible sealing sleeve having a lower end embracing said socket assembly and an upper end embracing said body portion whereby said sealing sleeve and said cover cooperatively protect said bearing means from ingress of foreign material.

5. In a vehicle wheel suspension assembly as defined in claim 4 wherein said ball joint member includes an upwardly facing flange between said ball portion and said trunnion, and wherein said bearing means is in the form of a bushing having a radial flange seating upon said upwardly facing flange.

6. In a vehicle wheel suspension assembly as defined in claim 5 wherein said trunnion projects beyond the upper end of said bore and the bushing therein, and a locking ring engaging the upper extremity of said trunnion.

7. In a vehicle wheel suspension assembly as defined in claim 6 wherein said bore extends completely through said body portion and is surmounted by an enlarged recess, said cover being in the form of a disc engaged in said recess.

8. In a vehicle wheel suspension assembly as defined in claim 7 wherein said cover is in the form of a spring guide plate seated upon said body portion.

9. In a vehicle wheel suspension assembly as defined in claim 4 wherein said bore extends completely through said body portion and is surmounted by an enlarged recess, said cover being in the form of a disc engaged in said recess.

10. In a vehicle wheel suspension assembly as defined in claim 4 wherein said cover is in the form of a spring guide plate seated upon said body portion.

* * * * *